United States Patent [19]

Loutfy et al.

[11] Patent Number: 5,470,680
[45] Date of Patent: Nov. 28, 1995

[54] ELECTROCHEMICAL FULLERENE SYSTEM

[75] Inventors: Raouf O. Loutfy; James C. Withers, both of Tucson, Ariz.

[73] Assignee: Materials and Electrochemical Research Corp., Tucson, Ariz.

[21] Appl. No.: 34,354

[22] Filed: Mar. 19, 1993

[51] Int. Cl.[6] .................................................. H01M 4/58
[52] U.S. Cl. .......................... 429/218; 429/27; 423/439; 205/57; 252/504; 204/280
[58] Field of Search ..................... 204/73 R, 280; 429/27, 213, 218; 205/57, 58; 423/439; 252/502, 504

[56] References Cited

U.S. PATENT DOCUMENTS 5,223,479  6/1993  McCauley et al. .................. 423/439 X

OTHER PUBLICATIONS

Krätschmer et al., "Solid $C_{60}$: A New Form of Carbon," *Nature*, vol. 347, No. 6291, pp. 354–358, Sep. 27, 1990.
Haufler et al. *Journal of Physical Chemistry* vol. 94, No. 24, pp. 8634–8636, Sep. 1990.
Chabre et al. "Electrochemical Intercalation of Lithium into Solid $C_{60}$", *J. Am. Chem. Soc.*, vol. 114, No. 2, 764–766 (1992).
Petrie et al. *J. Am. Chem. Soc.*, vol. 114, pp. 6268–6269, 1992.
Seger et al. "Prospects For Using $C_{60}$ and $C_{70}$ in Lithium Batteries", *J. Electrochem. Soc.*, v. 138, No. 12, L81–L82, Dec. 1991.
Curl et al. "Fullerenes", *Scientific American*, Oct. 1991, pp. 54–63.
Koshland "Molecule of the Year", *Science*, vol. 254, No. 5039, p. 1705, Dec. 20, 1991.
"Buckyballs: Wide Open Playing Field for Chemists" *Science* vol. 254, No. 5039, pp. 1706–1707, Dec. 20, 1991.
Jehoulet et al. "Electrochemical Reduction and Oxidation of $C_{60}$ Films", *J. Am. Chem. Soc.* vol. 113, pp. 5456–5457 (1991).
"Fundamentals of Fuel Cells", U.S. Dept. of Energy DE 93000002, Nov. 1992, 2 pages.

*Primary Examiner*—Stephen Kalafut
*Attorney, Agent, or Firm*—Ogram & Teplitz

[57] ABSTRACT

An electrochemical cell comprising a body of proton donor electrolyte in effective contact with first and second electrodes one of which consists essentially of a fullerene in contact with a conductive material. By the application of an electric current across the electrodes the cell can be used to hydrogenate the fullerene, thereby storing hydrogen and electric energy.

88 Claims, 7 Drawing Sheets

5,470,680

ELECTROCHEMICAL FULLERENE SYSTEM

This invention was made with Government support under U.S. Dept. of Defense, Contract No. F 29601-92-C-0039 awarded by the United States Air Force. The Government has certain rights in the invention.

This invention relates to improved electrochemical methods and apparati suitable for storing hydrogen and electrical energy through hydrogenation of the new form of carbon referred to as fullerene or Buckminsterfullerene.

BACKGROUND OF THE INVENTION

Buckminsterfullerene, or $C_{60}$, is a newly discovered form of solid carbon which consists of collections of 60 carbon atoms arranged in a symmetric configuration wherein each carbon atom in the spherical molecule is bound to three neighboring carbon atoms. The resulting structure, illustrated in FIG. 1, shows twelve 5-member rings separated by twenty 6-member rings. A method for synthesizing solid $C_{60}$ was first disclosed by W. Kratschmer, L. D., K. Fostiropoulos, and D. R. Huffman, "Solid $C_{60}$: A New Form of Carbon", Nature 347, pp. 354–358. Every carbon atom is in an equivalent position, with one of its four bonds available to combine with a hydrogen atom. Several methods have demonstrated the possibility to synthesize hydrogenated compounds of the structure $C_{60}H_x$, where $1 \leq x \leq 60$. Haufler R. E., Conccino J., et. al. "Efficient Production of $C_{60}$ (Buckminsterfullerene), $C_{60}H_{36}$, and the Solvated Buckide Ion", *J. Phys. Chem.* 1990, 94, pp. 8634–8636, described the use of Birch reduction to synthesize $C_{60}H_{36}$. Petrie S., Javahery G., Wang J., Bohme D. K., "Hydrogenation of Fullerene Cations in the Gas Phase: Reactions of Fullerene Cations and Dictations with Atomic and Molecular Hydrogen", *J. Am. Chem. Soc.*, 114, 6268–6269 (1992), disclosed the synthesis of $C_{60}H_{60}$ by a catalyzed reaction. However, the prior art of Birch reduction and catalytic hydrogenation suffers from process complexity and very low process yields, respectively. Birch reduction requires the use of alkali metal such as Li reductant in liquid ammonia which makes the process very complex and dangerous. Catalytic hydrogenation, on the other hand, uses precious metal catalyst under very high hydrogen pressure and results in only 5–10% yield of hydrogenated $C_{60}$.

Christophe Jehoulet and Allen J. Bard, "Electrochemical Reduction and Oxidation of $C_{60}$ films", *J. Am. Chem. Soc.* 1991, 113, 113, 5456–5457, describes the electrochemical study of films of $C_{60}$ on platinum electrodes as well as on gold and glassy carbon, which were studied in MeCN. The MeCN solvent lacks free protons. Accordingly, the electrochemical study of Jehoulet et al involved electron transfer to the $C_{60}$ fullerene and did not involve hydrogenation. Furthermore, this electron transfer process is limited, at most, to six electrons which makes the process unattractive as a battery or energy source. Thus, these studies did not involve or suggest a method of electrochemical hydrogenation of the fullerene molecule nor the production of a fuel cell or battery. This is made abundantly clear by the fact that Jehoulet et al do not disclose or suggest the use of a proton source electrolyte, i.e., a proton donor electrolyte, such as an aqueous electrolyte which would afford a source of hydrogen ions in the hydrogenation process.

Herein, the term "fullerene" shall refer to spheroidal carbon molecules having molecular weights, such as $C_{60}$ or $C_n$ or mixtures thereof. The material $C_{60}$ as produced usually includes some other molecular weights, especially $C_{70}$. Theoretically n may be any even number of at least 20, although the most common fullerenes known today are $C_{60}$ and $C_{70}$.

OBJECTS AND ADVANTAGES OF PRESENT INVENTION

It is an object of the present invention to provide a novel method to synthesize hydrogenated fullerene compounds affording less process complexity and danger than prior art Birch reduction methods and improved yields over prior art catalytic methods.

It is a further object of the present invention to provide improved methods and apparatus for hydrogen storage.

Another object of this invention is the provision of improved electrode structures. It is another object of this invention to provide improved storage batteries embodying such improved electrode structures.

These and other objects and advantages will be clear to one skilled in the art upon reading the detailed description to follow.

SUMMARY OF THE INVENTION

In accordance with the present invention, $C_{60}$ and other fullerenes are electrochemically hydrogenated to produce $C_nH_x$, where n is an even number of at least 20 and x is a number from 1 to n.

One aspect of the invention comprises a novel electrode structure consisting essentially of a particulate fullerene in contact with a particulate conductive material for connection to an electric circuit.

One embodiment of the invention involves the provision and use of an electrochemical cell comprising a body of proton donor electrolyte and first and second electrodes, being in effective contact with said electrolyte, wherein the first electrode consists essentially of a fullerene in contact with a conductive material, and wherein means including said conductive material are provided for connecting said electrodes to an electric circuit. This electrochemical cell can be used to hydrogenate the fullerene of the first electrode by applying an electric current source to said electrodes.

In one embodiment, the first electrode comprises a compressed admixture of particulate fullerene and particulate conductive material.

In a preferred embodiment the fullerene is essentially particulate and the conductive material is powdered conductive carbon, such as carbon black.

A further embodiment involves the provision of an improved fuel cell or battery system for storing hydrogen and electric energy.

DESCRIPTION OF THE PREFERRED EMBODIMENTS

The present invention comprises a method to electrochemically hydrogenate $C_{60}$ and related fullerene compounds of the formula $C_n$. The electrochemical hydrogenation of $C_{60}$, and other fullerenes in accordance with the present invention, is highly efficient, reversible, and offers significant advantages over other chemical storage techniques such as the use of metal hydrides, as a method to store hydrogen for practical applications. Such applications include rechargeable battery electrodes, hydrogen storage for hydrogen engines or fuel cells, hydrogen compression and purification, heat pumping, and refrigeration.

Figure 1:
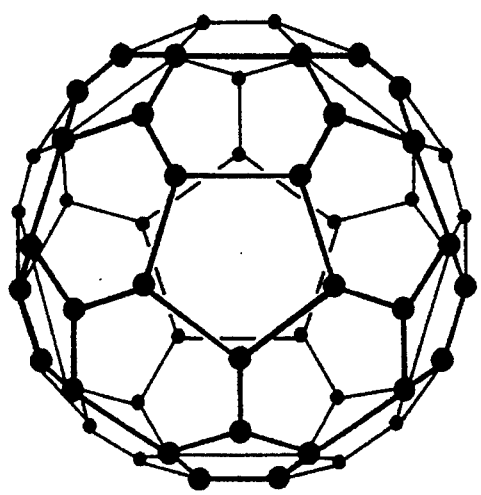
FIG. 1 is a schematic representation of fullerene $C_{60}$.
Figure 2:
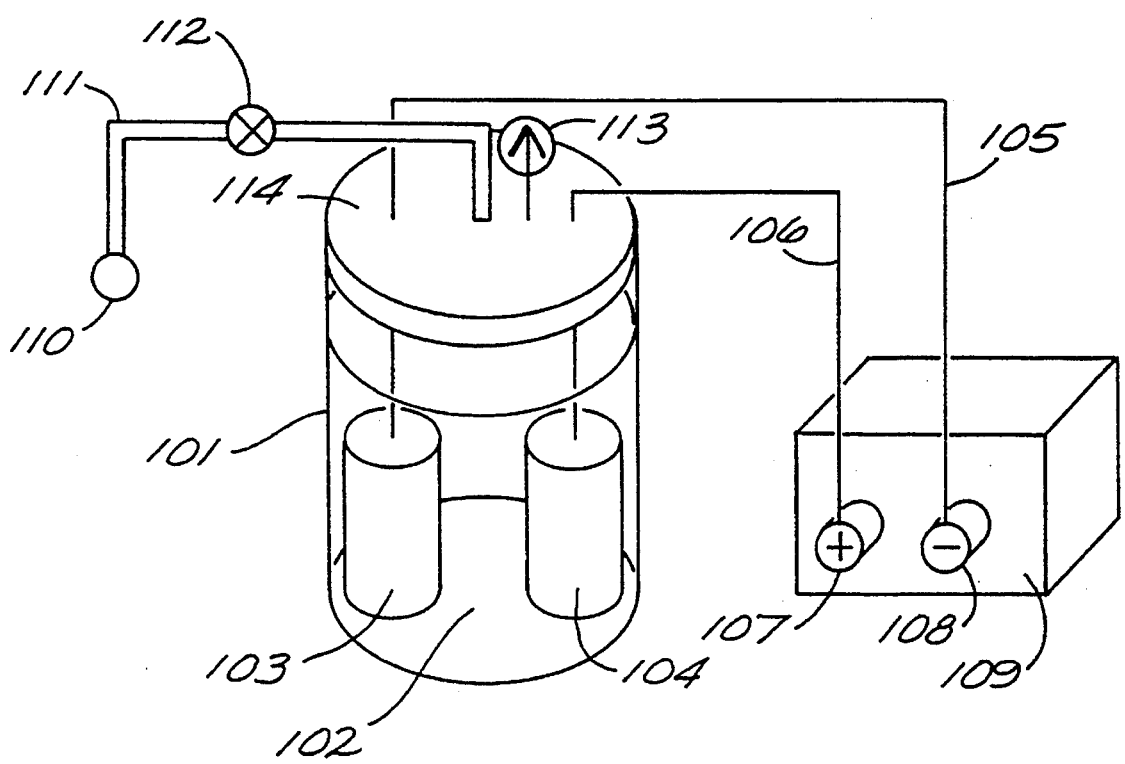
FIG. 2 is a schematic illustration of an electrochemical system including an electrochemical cell having a negative electrode comprising a fullerene and a conductive material and which is suitable to hydrogenate a fullerene such as $C_{60}$ in accordance with the present invention.

A schematic illustration of an electrochemical cell to hydrogenate $C_{60}$ and other fullerenes in accordance with the present invention is shown in FIG. 2. In FIG. 2 there is shown a suitable container, 101, which may be formed of material such as stainless steel lined with an appropriate liner (not shown) to contain a body of proton donor electrolyte 102 such as an aqueous solution of potassium hydroxide, or other electrolyte. Immersed within the body of electrolyte 102 are shown a first or negative electrode 103 and a second or positive electrode 104 having terminals shown connected by respective conductors 105 and 106 to the corresponding terminals 107, 108 of a current source 109 which may be an appropriate direct current source such as a generator or AC/DC converter supplied from a commercial AC power source.

The system of FIG. 2 can be operated with the container 101 open to the atmosphere at ambient atmospheric pressure. However, in order to operate the system at higher pressures, the container 101 may be provided with a cover 114.

A pump 110 is shown coupled to a first conduit 111 through a valve 112 for pressurizing the container 101 in carrying out certain aspects of the invention at different pressures, as described hereinafter. A pressure gauge 113 is shown atop the cover 114 for monitoring the pressure within.

Noteworthy features of this cell include:

(1) the electrochemical reaction which characterizes the cell at the $C_n$ electrode is:

$$C_n + xH^+ + xe^- \rightarrow C_nH_x$$

on charging, and $$C_nH_x \rightarrow C_n + xH^+ + xe^-$$

on cell discharge. Depending on the application, the hydrogen freed by this reaction may combine with the electrons to become gaseous $H_2$, or it may combine with OH ions in the electrolyte to form water.

(2) This result is important, and novel, because unlike the results reported by Segar L., Wen L. Q., and Schlenoff, "Prospects for Using $C_{60}$ and $C_{70}$ in Lithium Batteries". *J. Electrochem. Soc.*, Vol 138, No. 12, Dec. 1991, this work depends upon electrochemically binding up to 60 hydrogen atoms to the $C_{60}$ molecule, compared to earlier attempts which concluded, for example, that $C_{60}$ would not be effective as a lithium battery electrode when employing a reaction such as:

$$C_{60} + xLi^+ + xe^- \leftrightarrows C_{60}Li_x$$

because it was found that $C_{60}$ is soluble in the propylene carbonate/lithium perchlorate electrolyte, and the system shows poor electrochemical reversibility. Furthermore, since $0.5 < x < 12$ in the lithium system, because of the limited number of interstitial sites in the $C_{60}$ molecular structure, the charge carrying capacity per gram of the $C_{60}$ electrode is relatively low compared to $C_{60}H_x$. The most likely explanation for this difference is that the metal ions, in this case lithium ions, do not actually bind directly to the $C_{60}$ molecule as the hydrogen atoms do, but instead intersperse themselves in the voids between the $C_{60}$ molecules, as described by Chabre Y., Djurado D. et. Al., "Electrochemical Intercalation of Lithium into Solid $C_{60}$", *J. Am. Chem. Soc.*, 114, 764 (1992). Thus, the process is limited by the $C_{60}$ molecules' ability to accept electrons during charging which might be best represented by the notation:

$$C_{60} + xLi^+ + xe^- \leftrightarrows C_{60}{}^{x-} \cdot Li_x{}^+$$

(3) Because fullerenes such as $C_{60}$ are not good conductors, an electrode made from fullerenes must be made to conduct charge by adding a conductive material to the fullerenes material to ensure that electrons are easily added to the fullerene molecules. In accordance with the present invention several approaches work to overcome this requirement by the construction of electrodes for the electrochemical system, such as the cathode of FIG. 2, as follows:

(a) Powder forming methods. Beginning with fullerene powder, one may mix in powdered conductive material such as metals, intermetallics, or conductive carbon powders such as carbon black, to achieve the desired volume percentage conductive material. This conductive mixture may then be formed by several methods, including hot or cold pressing, into the desired final electrode shape. Electrical connections may be made to such an electrode by applying a powdered metal end cap to one end, and pressing it, or by soldering or applying a conductive layer such as conductive epoxy, directly to the end of the electrode.

(b) Thin film methods. Another method of ensuring good electrical contact for the fullerenes in the electrode is to evaporate a film of fullerenes onto a conductive substrate such as a metal or carbon or conductive polymer film. This process is made simple because fullerenes have very low sublimation temperatures, and may therefore be evaporated easily by a number of well known techniques. Such composite films offer very efficient transfer of electrical charge and hydrogen to the fullerenes. Experiments described in example 5, with fullerene films on silver foil showed hydrogenation up to $C_{60}H_{54}$ at room temperature and pressure. Alternatively, one may employ the unique solubility of fullerenes in non-polar solvents such as toluene, hexane, or benzene, to apply a coating of fullerenes by spin-coating or spraying solutions onto the conductive film of the electrode. A related technique to produce conductive films that would not necessarily require a conductive substrate, is to co-evaporate $C_{60}$ with a metal, producing an intercalated mixture on condensation as a film.

The positive electrode in the electrochemical cell shown in FIG. 2 is a nickelic hydroxide electrode similar to the well-known electrode in a Ni—Cd. Other positive electrode materials also may be used.

The electrochemical cell shown in FIG. 2 is normally operated at room temperature and pressure. However, the extent and rate of hydrogenation of the fullerene electrode may be improved by pressurizing the system to levels up to several hundred psi. This may be achieved by operating the pump or other source of pressurized gas 110 while the valve 112 is open to pressurize the system.

In carrying out the present invention, preferably the $C_n$ electrode is constructed by forming a mixture of $C_n$ embedded in a conductive matrix, preferably by cold or hot-pressing powders of $C_n$ and the matrix. Although many other conductors will perform well, preferred materials for the conductive matrix include approximately 10–50 volume % silver, or 10–50 volume % conductive carbon. The electrode may instead consist of a film of $C_n$ coating a conductive substrate such as a silver foil or a carbon cloth or conductive polymer. The coated substrates may then be rolled into a coil or stacked as multiple layers in the electrode housing to provide maximum $C_nH_x$ density. Hydrogen and electrons are transferred from the electrolyte solution to the $C_n$ electrode under the action of an applied voltage from a DC power supply as shown in FIG. 2, to form $C_nH_x$.

This invention further contemplate that novel uses may be made of materials $C_nH_x$ produced by the present method of electrochemical hydrogen of fullerenes to store hydrogen compactly and at low pressure for use in hydrogen purification or gathering, hydrogen combustion engines, or for hydrogen-air fuel cells. The solid $C_nH_x$ may be storm until the hydrogen gas is required, at which time the hydrogen gas may be liberated electrochemically, by the application of an electrical load across the electrodes 103,104 to discharge the cell, or by chemical dehydrogenation, or by heating the electrode.

It is further contemplated that materials $C_nH_x$ produced by the method of this invention can be used as a hydrocarbon fuel, or as an explosive. In these applications, the preferred electrode is a film of $C_n$ applied to a conductive foil or film from which the $C_nH_x$ product may be easily removed by mechanical means such as scraping or flexing the substrate after charging, although care must be taken to ensure that accidental spontaneous combustion does not occur.

Rechargeable electrochemical cells based on the method of this invention may be used either for storage of hydrogen for uses discussed above, or may constitute the elements of a battery for storage of electrical power. A preferred embodiment for such a secondary battery would be to replace the cadmium electrode in a typical Ni—Cd battery with a $C_n$—$H_x$ electrode.

The invention may be embodied in primary battery cells which employ the electrochemical hydrogenation of fullerenes to produce electrode materials $C_nH_x$, where x is nearly or identically equal to n, and thus holds the maximum amount of electrochemical energy possible using this system. Batteries with electrodes manufactured in this way might not be fully rechargeable, but would offer exceptionally high energy density.

Furthermore, in accordance with another aspect of the invention, electrochemical cells based on the electrochemical hydrogenation of fullerenes have been constructed wherein the fullerene electrode is pressurized to levels above 1 atm by mechanical means to enhance the rate and degree of hydrogenation during the charging step, and the efficiency and performance during discharge. Such mechanical means may include clamping the casing within which the fullerene electrode resides, and simple hydrostatic methods.

Figure 10A:
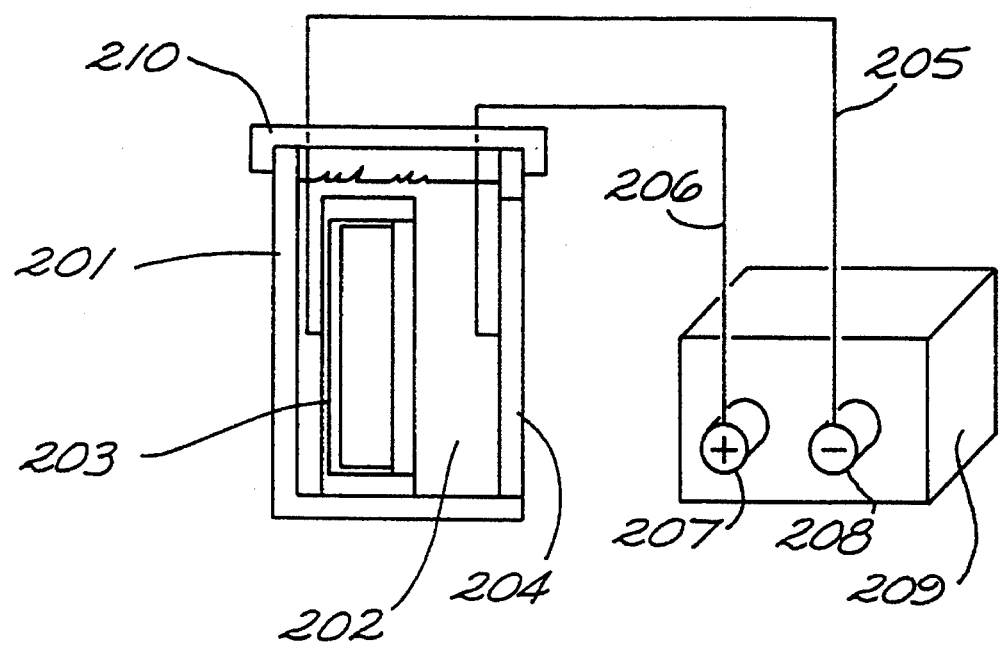
FIG. 10A is a schematic illustration of an electrochemical system generally like that FIG. 2, but using an air electrode as the non-fullerene electrode, for charging the $C_nH_x$ fullerene electrode.
Figure 10B:
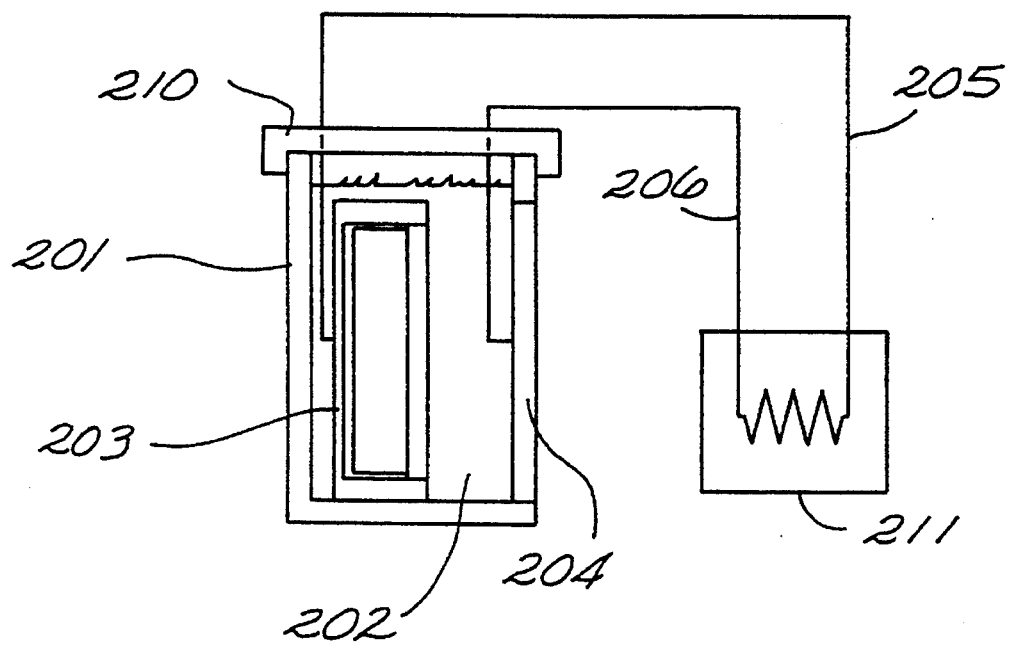
FIG. 10B is a schematic illustration of an electrochemical system in discharging the $C_nH_x$ electrode charged in the system of FIG. 10A, also using an air electrode as the non-fullerene electrode.

The fullerene electrode containing $C_nH_x$ may also form the basis of a related electrochemical energy storage and conversion device, as a hydrogen storage medium for a fuel cell. A schematic of a cell of this type is shown in FIGS. 10A and 10B. The cell requires only oxygen and water to produce electricity. Energy liberated from the $C_nH_x$ during discharge produces an electric current and water as its only products.

FIGS. 10A and 10B show a schematic of an electrochemical cell using a $C_nH_x$ electrode to store hydrogen and electrochemical energy to drive a "psuedo fuel cell". The electrochemical system of FIGS. 10A and 10B comprise a cell housing 201, having a removable cover 210, containing a body of electrolyte 202, within which is positioned a fullerene electrode 203, and which is provided with a porous air electrode, 204, which comprises a portion of the cell wall, 201.

As shown in the illustration, the inner wall of the porous air electrode is in contact with the electrolyte solution 202, and the outer surface is in contact with oxygen in the surrounding air. A first and second electrical conductor 205 and 206 connects the fullerene electrode and the air electrode, respectively to terminals 207 and 208 of the electrical DC power supply, 209.

In FIG. 10B, the electric power supply 209 is replaced by an electrical load 211, which is connected between the electrodes 203 and 204 by means of the respective conductors 205 and 206.

FIG. 10A is the charging configuration for such a cell.

When a current is applied from current source 209, electrons flow from the cathode of the current source to the $C_nH_x$ electrode 203. the electrons combine with $C_n$ and $H^+$ions from the electrolyte to form $C_nH_x$. Oxygen gas evolves at the porous air electrode 204 and is vented from the cell, either by a vent (not shown) or by diffusion out through the porous electrode 204. The $C_nH_x$ electrode construction illustrated shows a cross-section of a simple embodiment, wherein the electrical lead 205 makes contact with a conductive layer of material attached to a pellet pressed from a mixture of fullerene powder and a conductive matrix. Both the conductive layer and the pressed powder are enclosed in an insulative housing which is open to contact the electrolyte solution 202 on the face opposite to the conductive layer back plane. The construction of the cell is such that it allows the fullerene component a means to expand as hydrogen is stored and the material density decreases. This may be accomplished, for example, by the use of a flexible permeable membrane between the open face of the electrode and the electrolyte.

FIG. 10B shows the cell in discharge mode, with an electrical load 211 attached by leads 205,206 to electrodes 203 and 204 respectively. During discharge, oxygen gas is drawn in through the porous air electrode 204, where it combines with $OH^-$ ions from the aqueous KOH electrolyte to form water and to produce the electrons which then travel as current through load 211 back to $C_nH_x$ electrode 203.

During charging, pure oxygen is made as a byproduct of the process. The hydrogen in the $C_nH_x$ is produced from electrolysis of water, and immediate reaction with $C_n$ in the cathode. One may write the reactions as:

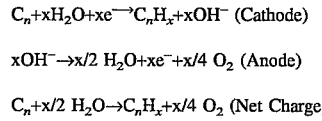

$$C_n + xH_2O + xe^- \rightarrow C_nH_x + xOH^- \text{ (Cathode)}$$

$$xOH^- \rightarrow x/2\ H_2O + xe^- + x/4\ O_2 \text{ (Anode)}$$

$$C_n + x/2\ H_2O \rightarrow C_nH_x + x/4\ O_2 \text{ (Net Charge)}$$

On discharge, the process is reversed. The discharge reaction does not need to be performed in the same cell as the charge reaction. For some applications, it may be preferable to charge the $C_nH_x$ electrode in a separate apparatus such as that shown in FIG. 2, to achieve economies of scale or to maximize the degree of hydrogenation of the fullerene. The anode is a $C_nH_x$ electrode, and the cathode is an air electrode such as the air electrode 204 shown in FIGS. 10A and 10B. An air electrode is an electrode in contact with both the electrolyte and with gaseous $O_2$, which allows the $O_2$ to participate in the reaction of the cell. The $O_2$ may be pure $O_2$, or may be a component of air. The reactions for discharge may be written as:

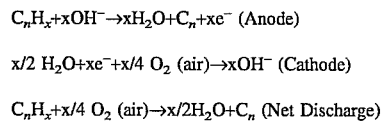

$$C_nH_x + xOH^- \rightarrow xH_2O + C_n + xe^- \text{ (Anode)}$$

$$x/2\ H_2O + xe^- + x/4\ O_2 \text{ (air)} \rightarrow xOH^- \text{ (Cathode)}$$

$$C_nH_x + x/4\ O_2 \text{ (air)} \rightarrow x/2 H_2O + C_n \text{ (Net Discharge)}$$

EXAMPLE 1

Figure 3:
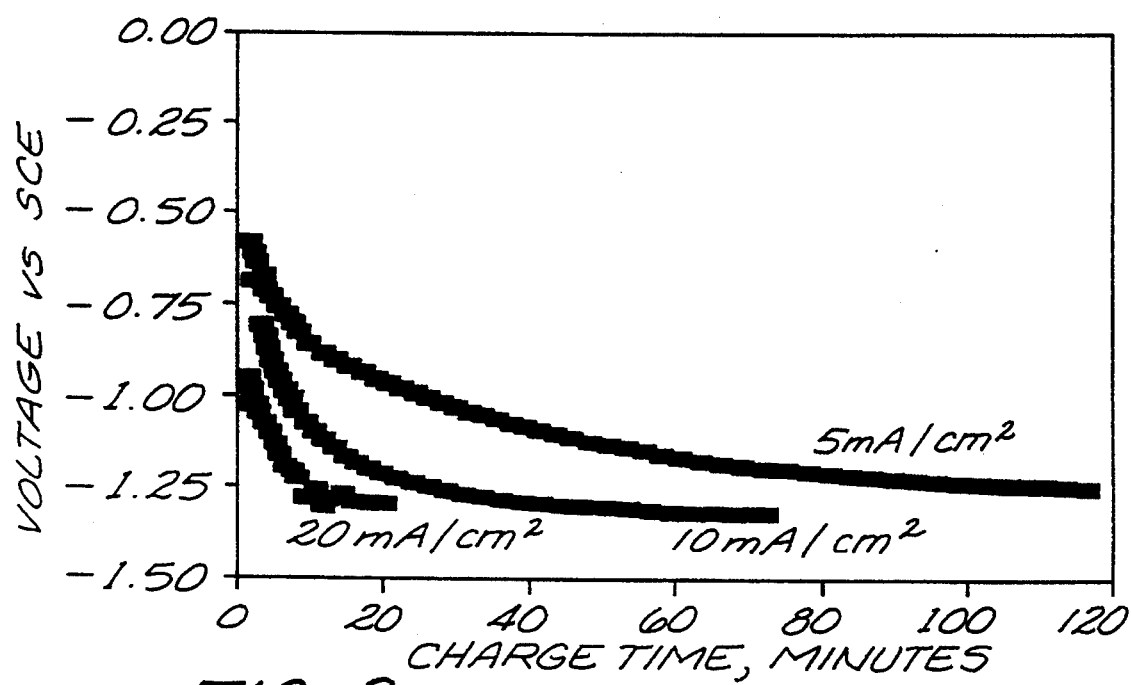
FIG. 3 is a graph illustrating the charging characteristic curves of an electrochemical cell as shown in FIG. 2 when provided with a $C_nH_x$—Ag negative electrode.

This example was carded out using an electrochemical cell as shown in FIG. 2. electrode was pressed from mixed fullerene powder, produced by the Huffman-Kratschmer process, consisting predominantly of $C_{60}$(~85–90%), $C_{70}$(~10–13%) and the remainder higher molecular weight fullerenes, and 17 volume % silver. A conductive wire lead was attached by means of a conductive epoxy to the electrode, and that wire was attached to the negative output of a regulated DC current source. The positive output of the supply was attached to a nickelic hydroxide electrode, and both electrodes were immersed in an aqueous 30% KOH solution. The current was set to levels indicated in FIG. 3, and allowed to charge the $C_nH_x$ electrode until the voltage reached −1.3 volts vs. SCE, while for discharging the cutoff voltage was typically at −0.2 volts vs. SCE. Cutoff voltages correspond to the levels at which gaseous hydrogen evolved during charging, and gaseous oxygen evolved during discharge. Voltages were monitored by computer data acquisition techniques, producing the typical graphs shown in FIGS. 3 and 4.

Figure 4:
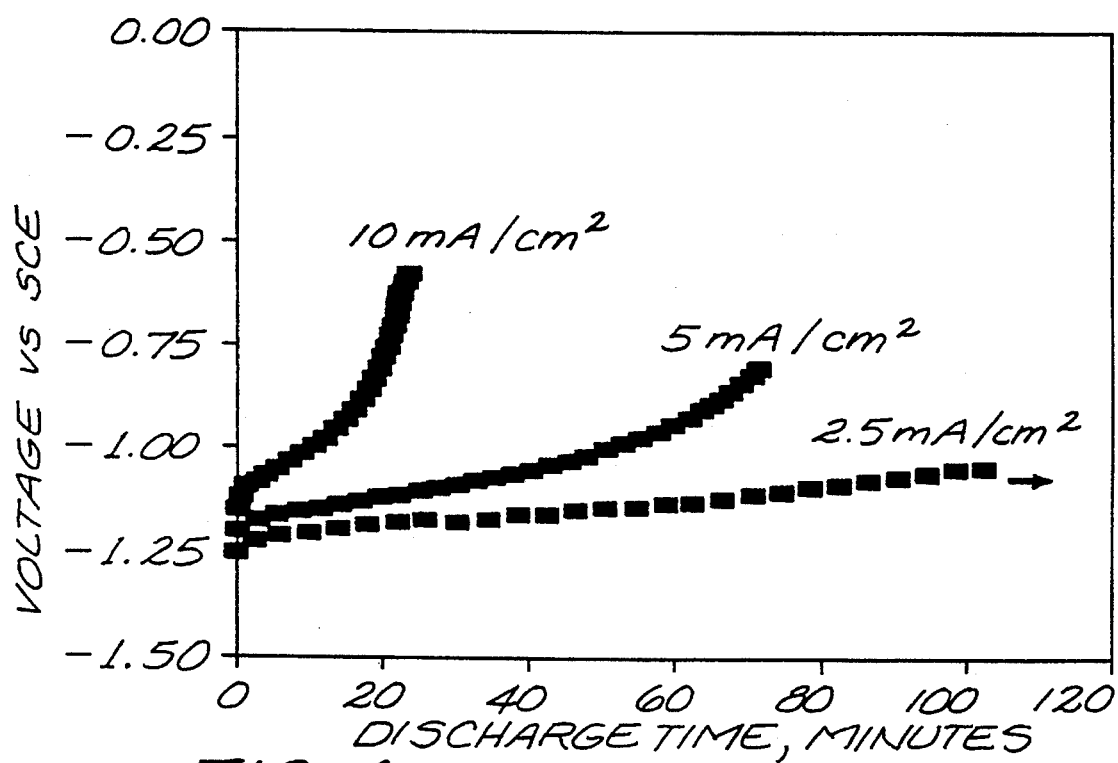
FIG. 4 is a graph illustrating the discharge characteristic curve of the electrochemical cell of FIG. 2 provided with the $C_nH_x$—Ag negative electrode described in reference to FIG. 3.

The polarity on the current source was reversed to allow the cell to discharge at the current density levels shown in FIG. 4. Cells were charged and discharged repeatedly, demonstrating the ability of the cell to withstand cyclic use. This experiment also demonstrated that the energy stored during charge and that recovered from the electrode during discharge was dependent on the current density at which the charge or discharge occurred. Results for the $C_nH_x$—Ag electrode are tabulated below:

| Measured Charge and Discharge Capacity for $C_nH_x$-Ag Electrodes | | | |
|---|---|---|---|
| Current Density, mA/cm² | Charge Capacity, A-hr/cm² | Discharge Capacity, A-hr/cm² | Net Storage Efficiency |
| 5 | 0.0063 | 0.0058 | 92% |
| 10 | 0.0058 | 0.0042 | 72% |
| 20 | 0.0050 | 0.0030 | 60% |

At low charge and discharge current densities, the $C_nH_x$ electrode demonstrated excellent storage efficiencies. Comparable maximum efficiency of sealed Ni—Cd cells is about 71%, while vented Ni—Cd cell maximum efficiency ranges from 67% to 80%.

EXAMPLE 2

Figure 5:
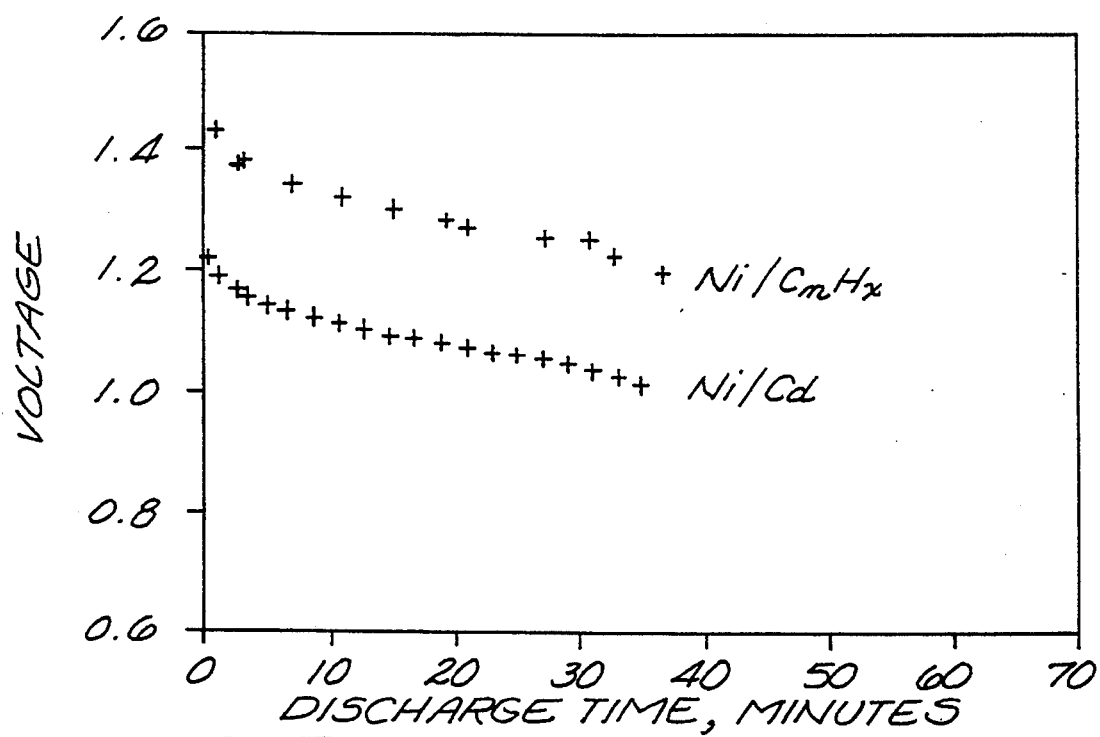
FIG. 5 is a graph illustrating a comparison of the discharge performance of a typical commercial nickelic hydroxide electrode (NiCd) cell versus that of an electrochemical cell in accordance with the present invention using Ni—$C_nH_x$, as described in Example 2.

The discharge performance at 2.5 mA/cm² of the $C_nH_x$ electrode consisting of 17 volume % Ag in 30% KOH vs. a commercial nickelic hydroxide electrode using a cell configuration similar to that described in Example 1, was calculated from measured voltage differences between the two electrodes. A similar curve was generated for discharge of a standard Ni—Cd rechargeable cell for comparison. The result is plotted in FIG. 5. The performance of this cell is exceptional, with OCV of about −1.5 V and nominal discharge voltage of −1.3 V, compared to OCV of −1.25 V and −1.1 V for the Ni—Cd. This result clearly demonstrates the feasibility of using $CH_x$ instead of Cd in rechargeable battery applications.

EXAMPLE 3

Figure 6:
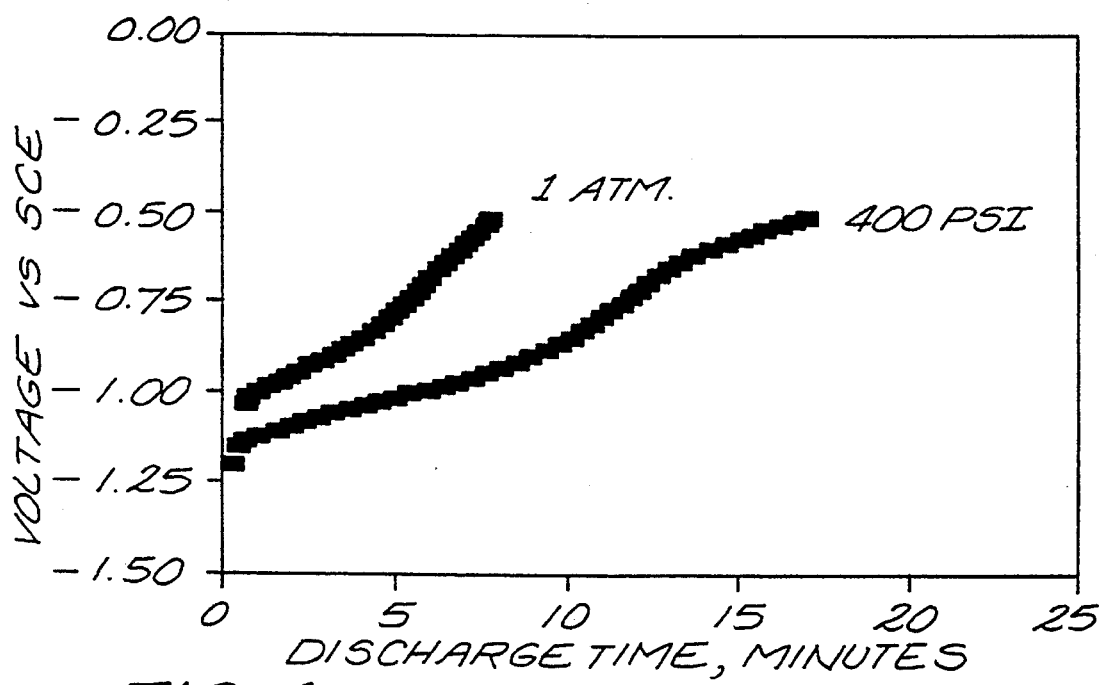
FIG. 6 is a graph illustrating the effect of different pressures upon the discharge behavior of an electrochemical system as shown in FIG. 2 utilizing a $C_{60}$—Ag negative electrode.

Again using an electrochemical cell constructed as in Example 1, with the $C_nH_x$ electrode consisting of 17 volume % Ag in 30% KOH, the charge-discharge performance was evaluated under high hydrogen pressure. The pressurized hydrogen employed in this instance may be replaced with any other means to increase the cell pressure, including use of other pressurized gases such as air, or an inert gas, or mechanical or hydraulic techniques. Such pressures may simulate conditions in a sealed battery. In this experiment, the current density was set to 20 mA/cm², which at 1 atm pressure, showed relatively poor performance. As FIG. 6 shows, however, the low discharge efficiency at relatively high current density and low pressure may be overcome or significantly improved by operating at high pressure, 400 psi in this case.

EXAMPLE 4

Figure 7A:
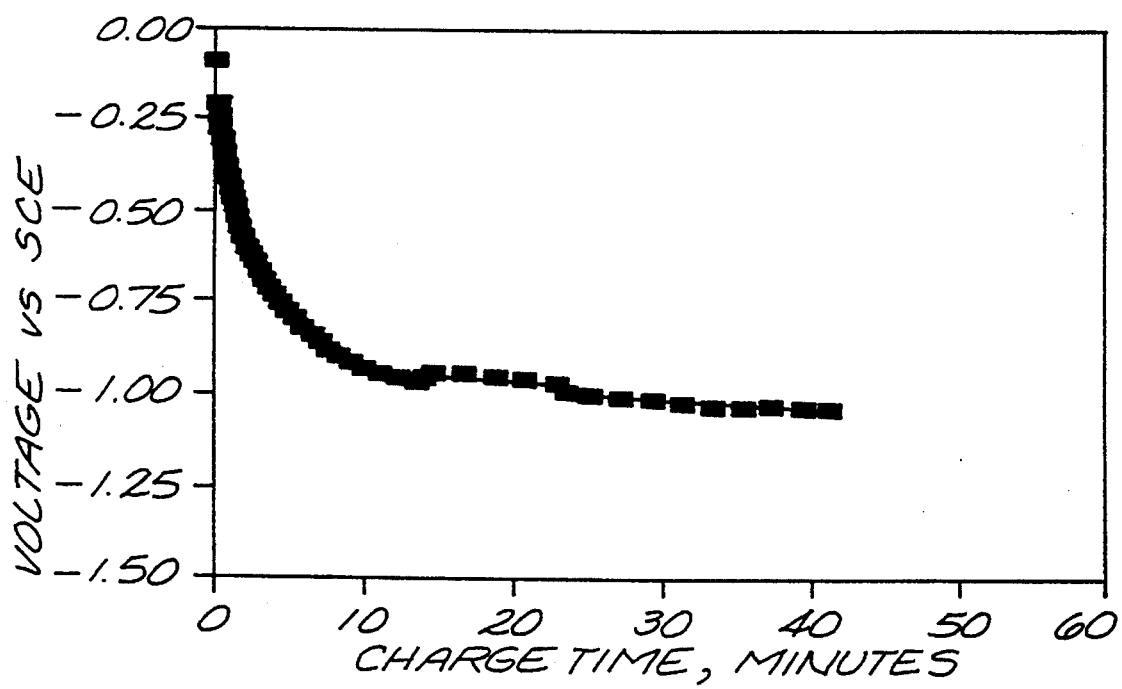
FIG. 7A is a graph illustrating the Charge Time Characteristic of an electrochemical system as shown in FIG. 2 using a negative electrode formed of a mixture of conductive carbon powder and powdered fullerenes, as described in Example 4.
Figure 7B:
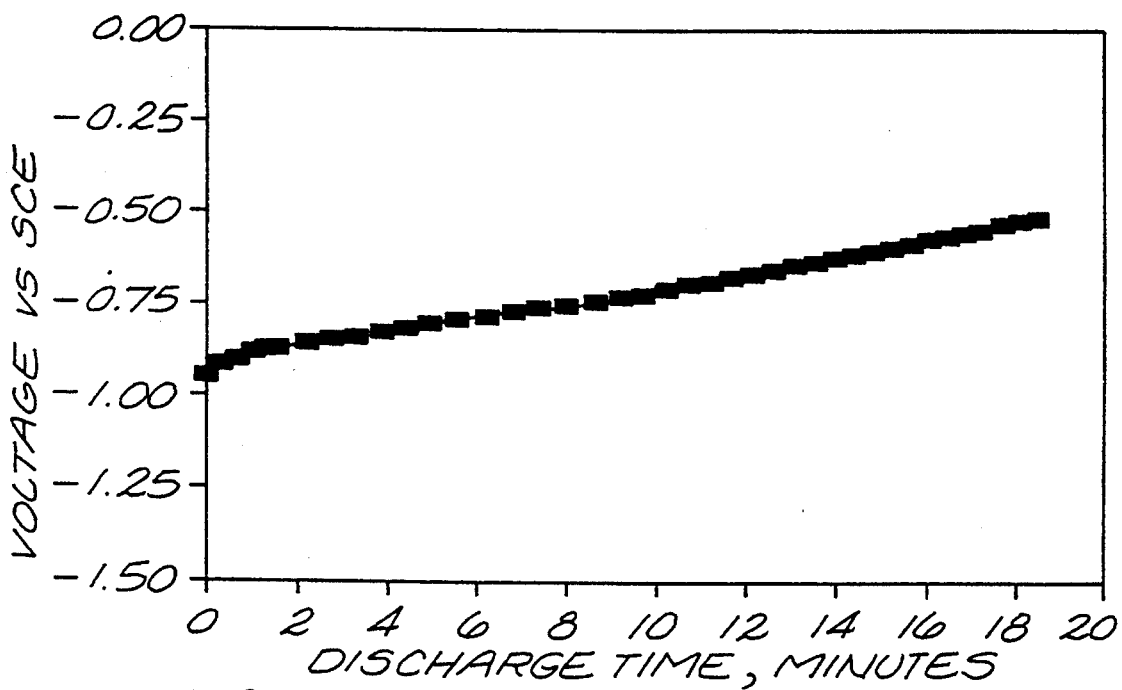
FIG. 7B is a graph illustrating the Discharge Time Characteristic of the electrochemical system of FIG. 2 using the negative electrode formed of conductive carbon powder and powdered fullerenes, as described in Example 4.

Although the $C_nH_x$—Ag electrodes employed in Examples 1–3 show excellent performance, it is desirable to produce a lower cost electrode by eliminating the requirement for silver. In this example an electrochemical cell as shown in FIG. 2 was used and the negative electrodes were formed by mixing 17 volume % conductive carbon powder with the C, and then cold pressing them together. These electrodes were charged and discharged at 10 mA/cm$^2$ current density. FIG. 7 shows the resulting charge-discharge behavior in 30% KOH electrolyte. The voltage for charge and for discharge are less negative than for the $C_nH_x$—Ag electrode, which may be due in part to resistive effects due to the higher conductivity of silver.

EXAMPLE 5

Figure 8A:
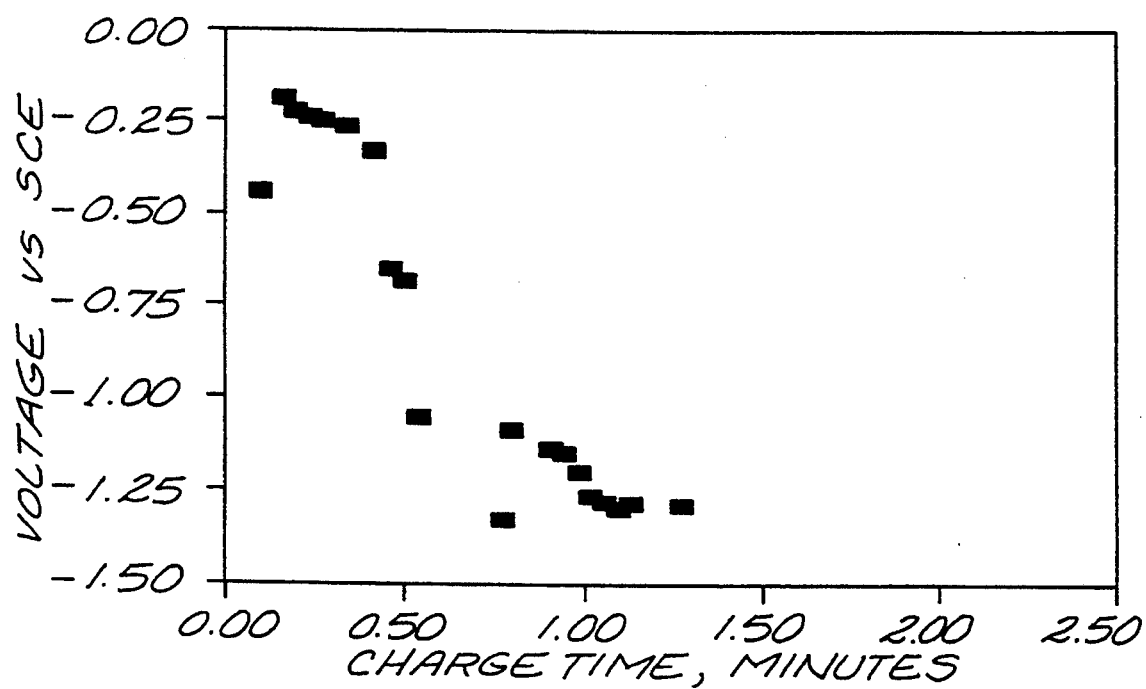
FIG. 8A is a graph illustrating the Charge Time Characteristic of an electrochemical system as shown in FIG. 2 using a negative electrode formed of fullerene film on a silver substrate, as described in Example 5.
Figure 8B:
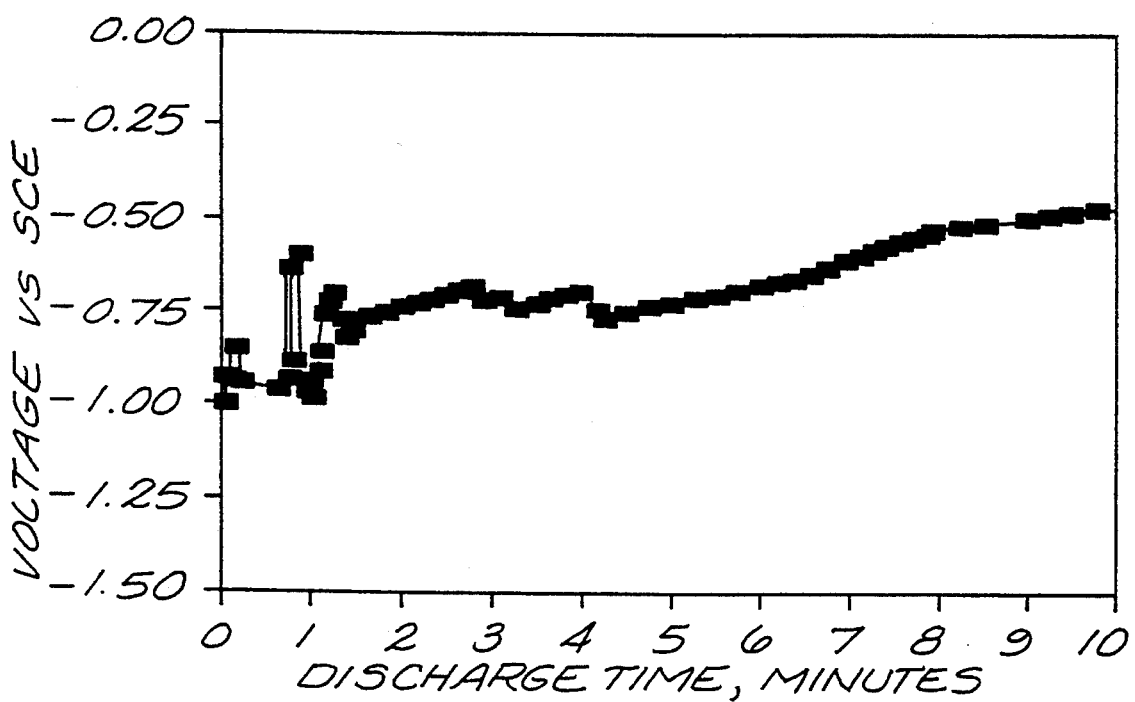
FIG. 8B is a graph illustrating the Discharge Time Characteristic of the electrochemical system of FIG. 2 using the negative electrode formed of fullerene film on a silver substrate, as described in references to FIG. 7A.

The charge-discharge behavior of a 2.0 μm $C_{60}$ film on a silver substrate was measured using an apparatus similar to that used in Example 1, with a 30% KOH electrolyte. The charge and discharge capacities of the film were estimated to be approximately equal at 1.25 mA-hr/cm$^2$. Since the density, thickness and the area of the film is known, and the discharge current is known, the degree of hydrogenation of the predominantly $C_{60}$ fullerene film may be estimated by computing the number of moles of $C_{60}$ and the number of moles of hydrogen generated. This calculation resulted in a ratio of H:$C_{60}$ equal to 56, indicating a nominal formula of $C_{60}H_{56}$ for the hydrogenated product. FIG. 8 shows the charge-discharge behavior of the fullerene film on silver, operating at a current density of 10 mA/cm$^2$.

EXAMPLE 6

Figure 9A:
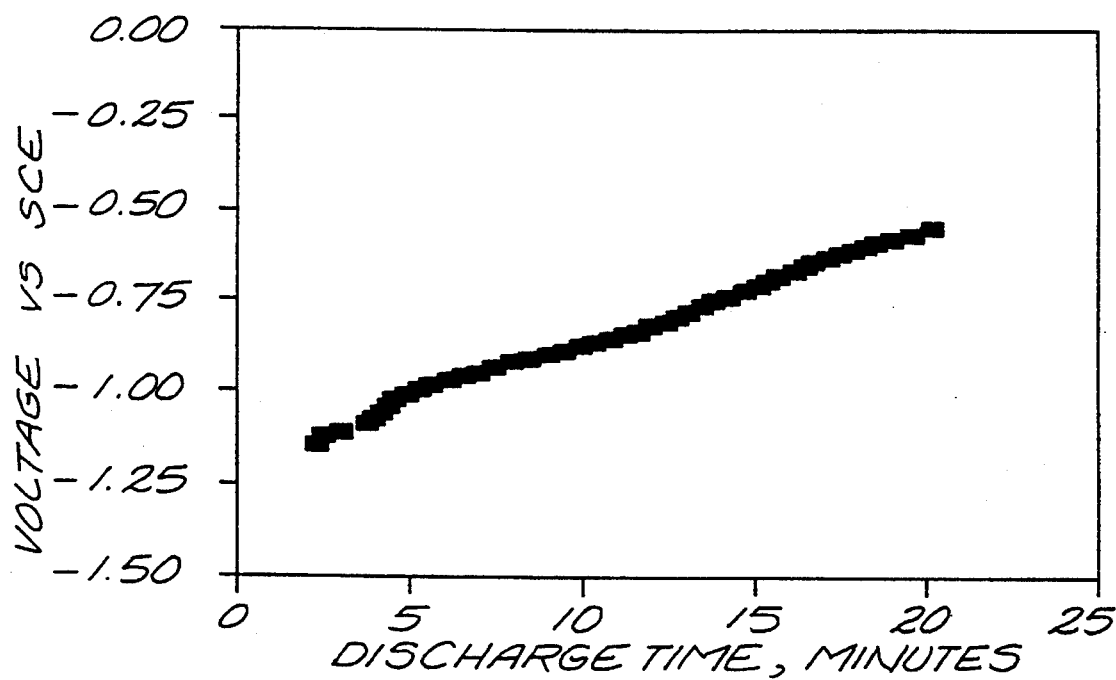
FIG. 9A is graph illustrating the discharge behavior of an electrochemical system as shown in FIG. 2 provided with a negative electrode formed of $C_nH_x$—Ag as described in Examples 1–3, when discharged immediately after being charged as described in Example 6.
Figure 9B:
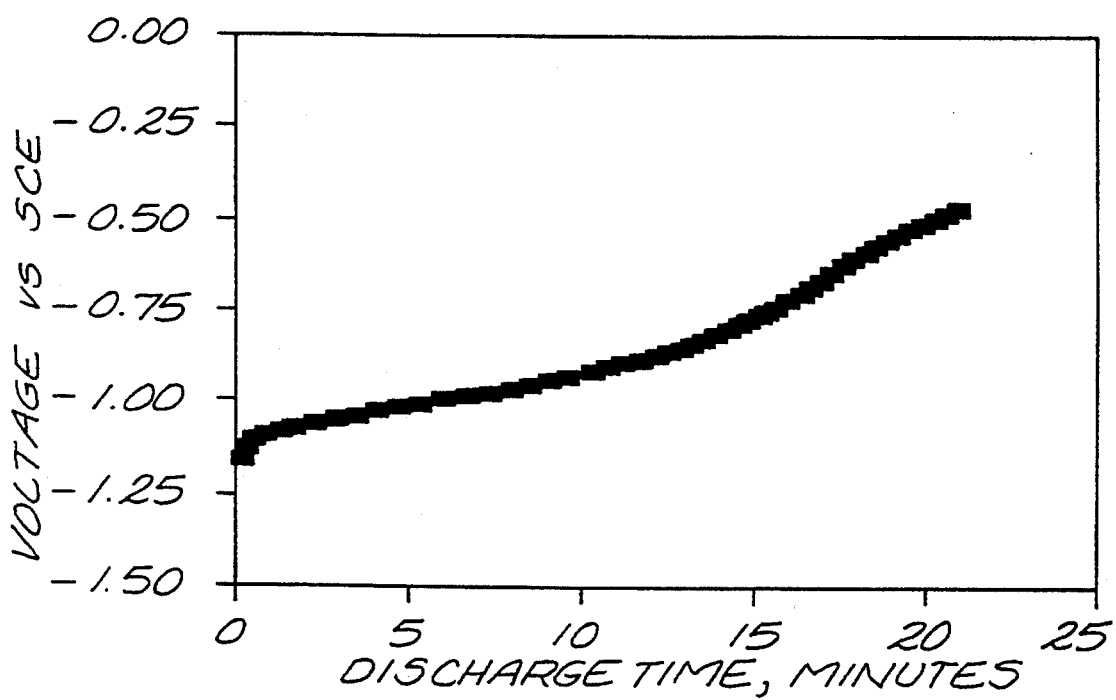
FIG. 9B is a graph illustrating the discharge behavior of the electrochemical system of FIG. 2 using a $C_nH_x$ negative electrode as described in Examples 1–3, when discharged following a 24 hour period after being charged, as described in Example 6.

A fullerene-Ag electrode similar to those used in Examples 1 through 3 was charged and held on open circuit for 24 hours while immersed in 30% KOH solution. The discharge behavior at a current density of 10 mA/cm$^2$ is shown in FIG. 9 for a fully charged electrode immediately after charge, and after 24 hours on open circuit. Although a more detailed analysis was not performed, the qualitative assessment of these curves shows very little change, indicating a slow rate of self-discharge.

EXAMPLE 7

In Example 5 it was found that the level of hydrogenation was approximately $C_{60}H_{56}$ in the thin film electrode. In this example, a determination of the level of hydrogenation typical of the mixed fullerene Ag electrode was made using the Elastic Recoil Detection (ERD) of hydrogen and carbon. The electrode was charged at a current density of 10 mA/cm$^2$ as in Example 1. The electrode was dried, and the surface was scraped to remove any residual KOH from the electrode. The composition of the hydrogen in the $C_{60}$ fraction of the electrode was estimated from the result of ERD proton spectrum to be approximately $C_{60}H_{18}$. This estimate is valid for a layer of material measured to a depth of between 1.0 to 1.51 μm thick. The surface layer which was scraped off and therefore not measured may have a greater level of hydrogenation, and deeper level layers within the pressed electrode may show lesser hydrogenation. However, one may use this result and the result of Example 5 to calculate a theoretical specific charge carrying capacity of an electrode pressed from fullerene powder and 17 volume % carbon ("fullerene mixed"), and the capacity of a fullerene film-based electrode consisting of 50% $C_{60}$ and 50% conductive carbon ("fullerene film"). These result of those calculations is presented in the table below:

| Electrode | Theoretical Capacity of $C_{60}H_x$ Electrodes | |
|---|---|---|
| | Nominal Composition | Specific Capacity, mA-hr/gm |
| — | $C_{60}H_{60}$ | 2250 |
| — | $C_{60}H_{36}$ | 1340 |
| fullerene film | $C_{60}H_{56}$ | 1042 |
| fullerene mixed | $C_{60}H_{18}$ | 551 |

Both of the electrode capacity values compare quite favorably with the best metal hydride electrode, which is about 320 mA-hr/gm. The degree of hydrogenation in the C mixed electrode, which is quite easy to produce, may possibly be enhanced by charging under pressure.

What is claimed is as follows:

1. A method for the electrochemical production of $C_nHx$, wherein C=carbon, H=hydrogen, n=a multiple of 2 that is at least 20, x=a number from 1 to n, that comprises the hydrogenation of $C_n$ by applying a source of electric current across a pair of electrodes of an electrochemical cell wherein said electrodes are in contact with an effective proton donor electrolyte, wherein one of said electrodes comprises $C_n$ in contact with a conductive material to which said electric current is applied.

2. The method of claim 1 wherein $C_n$ is essentially $C_{60}$.

3. The method of claim 1 wherein the conductive material is a metal.

4. The method of claim 2 wherein the conductive material is a metal.

5. The method of claim 3 wherein the conductive metal is silver.

6. The method of claim 3 wherein the conductive metal is in the form of a substrate upon which the $C_n$ is deposited.

7. The method of claim 4 wherein the conductive metal is in the form of a substrate upon which the $C_n$ is deposited.

8. The method of claim 1 wherein the conductive material is a particulate conductive material admixture with the $C_n$ which is in powdered form.

9. The method of claim 2 wherein the conductive material is a particulate conductive material in admixture with the $C_{60}$ which is in powdered form.

10. The method of claim 8 wherein the conductive particulate material is powdered conductive form of carbon.

11. The method of claim 9 wherein the conductive particulate material is powdered conductive forms of carbon.

12. The method of claim 1 wherein the electrolyte is an aqueous solution of potassium hydroxide.

13. The method of claim 3 wherein the electrolyte is an aqueous solution of potassium hydroxide.

14. The method of claim 10 wherein the electrolyte is an aqueous solution of potassium hydroxide.

15. An electrochemical cell comprising means defining a body of a proton donor electrolyte, first and second electrodes in effective contact with said electrolyte, said first electrode consisting essentially of a fullerene in contact with a conductive material, and wherein means including said conductive material are provided for applying an electric current across said electrodes.

16. The electrochemical cell of claim 15 wherein the fullerene is essentially $C_{60}$.

17. The electrochemical cell of claim 15 wherein the conductive material is a metal.

18. The electrochemical cell of claims 16 wherein the conductive material is a metal.

19. The electrochemical cell of claim 17 wherein the conductive metal is silver.

20. The electrochemical cell of claim 18 wherein the conductive metal is silver.

21. The electrochemical cell of claim 17 wherein the conductive metal is in the form of a substrate upon which the fullerene is deposited.

22. The electrochemical cell of claim 18 wherein the conductive metal is in the form of a substrate upon which the fullerene is deposited.

23. The electrochemical cell of claim 15 wherein the conductive material is a particulate conductive material in admixture with the fullerene.

24. The electrochemical cell of claim 16 wherein the conductive material is a particulate conductive material in admixture with the fullerene.

25. The electrochemical cell of claim 24 wherein the particulate conductive material is powdered conductive form of carbon.

26. The electrochemical cell of claim 24 wherein the particulate conductive material is powdered metal.

27. The electrochemical cell of claim 15 wherein the electrolyte is an aqueous solution of potassium hydroxide.

28. The electrochemical cell of claim 23 wherein the electrolyte is an aqueous solution of potassium hydroxide.

29. A battery comprising a body of a proton donor electrolyte, first and second electrodes in effective contact with said electrolyte, said first electrode consisting essentially of a fullerene in contact with at least one conductive material, and conductive terminal means for deriving an electric current from said battery.

30. A battery as defined in claim 29 wherein said first electrode comprises the combination of a particulate fullerene in intimate contact with a particulate conductive material in admixture with the particulate fullerene, and terminal means suitable for connecting said electrode to an electric circuit.

31. An electrode suitable for use in an electrochemical cell having a proton donor electrolyte comprising the combination of a fulleride in intimate contact with a conductive material wherein the fulleride is in particulate form and the conductive material is also in particulate form and is in admixture with the fulleride particles.

32. An electrode as defined in claim 31 wherein the conductive material is a conductive form of carbon.

33. An electrode as defined in claim 31 wherein the conductive material is a metal.

34. A battery as defined in claim 29 wherein the conductive material of the first electrode comprises a conductive substrate and the fullerene comprises a film deposited on said metal.

35. A battery as defined in claim 30 wherein the conductive material is a conductive form of carbon.

36. A battery as defined in claim 29 wherein the conductive material is in the form of a conductive polymer film.

37. A battery as defined in claim 35 wherein the conductive carbon material comprises approximately 10–50 volume percent of the electrode particulate.

38. An electrode as defined in claim 33 wherein the metal is silver.

39. A battery as defined in claim 34 wherein the conductive material of the substrate is a silver foil.

40. An electrode as defined in claim 32 wherein the conducting carbon material comprises approximately 10–50 volume percent of the electrode particulate.

41. An electrode as defined in claim 33 wherein the conductive metal material is silver that comprises approximately 10–50 volume percent of the electrode particulate.

42. The method of claim 1 for storing hydrogen that comprises applying said source of electric current to the electrodes of said electrochemical cell for sufficient time to produce a significant quantity of $C_nH_x$ in the electrode of said cell that comprises $C_n$.

43. The method of claim 42 which further comprises removing said source of electric current from said electrodes and causing said cell to discharge and release said $H_x$.

44. The method of claim 43 which further comprises the step of collecting said released $H_x$.

45. The fullerene hydride compound $C_nH_x$ produced by the method of claim 1, wherein the $C_nH_x$ is produced by the electrochemical reaction $C_n+xH^++xe^- \rightarrow C_nH_x$, and which is characterized by an electrochemical activity sufficiently high so as to enable the hydrogen to be electrochemically releasable from the fullerene pursuant to the reaction $C_nH_x \rightarrow C_n+xH^++xe^-$.

46. The compound $C_nH_x$ produced by the method of claim 1, wherein the $C_nH_x$ is produced by the electrochemical reaction $C_n+xH^++xe^- \rightarrow C_nH_x$ and wherein the $C_nH_x$ is further characterized in that the subscript x is equal to the subscript n.

47. The method of claim 42 which further comprises discharging the electrode embodying the $C_nH_x$.

48. The method of claim 47 wherein the discharge of the electrode embodying the $C_nH_x$ is carried out using an electrochemical system having an air electrode.

49. The method of claim 48 wherein the discharge of the electrode embodying the $C_nH_x$ is carried out in a separate electrochemical system from that in which said electrode is charged to produce the $C_nH_x$.

50. An electrochemical cell as defined in claim 15 wherein the second electrode is an air electrode.

51. A battery as defined in claim 29 wherein the second electrode is an air electrode.

52. The method of claim 1 that is carried out at ambient atmospheric pressure.

53. The method of claim 1 that is carried out while subjecting the electrochemical cell to pressure in excess of ambient atmospheric pressure.

54. The method of claim 53 wherein the electrochemical cell is subjected to pressure in the range of 15 to 400 psi.

55. An electrode as defined in claim 31 wherein the fulleride is a fulleride of essentially $C_{60}$.

56. An electrochemical cell as defined in claim 15 wherein the second electrode consists essentially of nickelic hydroxide.

57. An electrochemical cell as defined in claim 15 further including means for subjecting the cell to pressure in excess of ambient atmospheric pressure.

58. An electrochemical cell as defined in claim 56 further including means for subjecting the cell to pressure in excess of ambient atmospheric pressure.

59. The method of claim 42 that further comprises discharging said cell to release said $H_x$ and collecting said released $H_x$ and wherein the discharge of said cell is carried out using an electrochemical system having an air electrode.

60. The fullerene hydride compound $C_nH_x$, wherein C=carbon, H=hydrogen, n=a multiple of 2 that is at least 20, and x=a number from 1 to n, wherein the $C_nH_x$ is produced by the electrochemical reaction $C_n+xH^++xe^- \rightarrow C_nH_x$, and which is characterized by an electrochemical activity sufficiently high so as to enable the hydrogen to be electrochemically releasable from the fullerene pursuant to the reaction $C_nH_x \rightarrow C_n + xH^+ + xe^-$.

61. The compound $C_nH_x$ produced by the electrochemical reaction of claim 60, wherein the $C_nH_x$ is further characterized in that the subscript x is equal to the subscript n.

62. The electrochemical cell of claim 15 wherein the conductive material is a conductive form of carbon.

63. The electrochemical cell of claim 62 wherein the conductive carbon is in the form of a carbon cloth.

64. The electrochemical cell of claim 15 wherein the conductive material is a conductive polymer.

65. An electrochemical assembly comprising the combination of a conductive material, a proton donor electrolyte and a fullerene in contact with both the conductive material and the proton donor electrolyte.

66. The electrochemical assembly as defined in claim 65 wherein the conductive material is a conductive form of carbon.

67. An electrochemical assembly as defined in claim 65 wherein the conductive material is a metal.

68. An electrochemical assembly as defined in claim 67 wherein the metal is silver.

69. An electrochemical assembly as defined in claim 66 wherein the conductive carbon material comprises approximately 10–50 volume percent of the electrode particulate.

70. An electrochemical assembly as defined in claim 67 wherein the conductive metal material is silver that comprises approximately 10–50 volume percent of the electrode particulate.

71. An electrochemical assembly as defined in claim 65 wherein the fullerene is essentially $C_{60}$.

72. The electrochemically produced compound $C_nH_x$ of claim 60 that is $C_{60}H_{56}$.

73. An electrode structure comprising the electrochemically produced compound $C_nH_x$ of claim 60 and a conductive material in intimate contact therewith.

74. An electrode structure as defined in claim 73 wherein the electrochemically produced compound is $C_{60}H_{56}$.

75. Fullerene hydride of the formula $C_nH_x$, wherein C=carbon, H=hydrogen, n=a multiple of 2 that is at least 20, and x=a number from 1 to n, which is characterized by an electrochemical activity sufficiently high so as to enable the hydrogen to be electrochemically releasable from the fullerene pursuant to the reaction $C_nH_x \rightarrow C_n + xH^+ + xe^-$.

76. Fullerene hydride as defined in claim 75 wherein the subscript x is equal to the subscript n.

77. Fullerene hydride as defined in claim 75 wherein n=60.

78. Fullerene hydride as defined in claim 77 wherein x=56.

79. An electrode structure comprising fullerene hydride of the formula $C_nH_x$ wherein hydrogen is electrochemically releasable from the fullerene pursuant to the reaction $C_nH_x \rightarrow C_n + xH^+ + xe^-$, and a conductive material in electrical contact therewith.

80. An electrode structure as defined in claim 79 comprising an admixture of particulate conductive material and particulate fullerene that is hydrided to form the fullerene hydride.

81. An electrode structure as defined in claim 79 wherein the conductive material is a metal.

82. An electrode structure as defined in claim 79 wherein the conductive material is in the form of a conductive substrate upon which a film of fullerene is deposited and hydrided to form the fullerene hydride.

83. An electrode structure as defined in claim 82 wherein the conductive substrate comprises a metal foil.

84. An electrode structure as defined in claim 82 wherein the conductive substrate is a conductive polymer film.

85. An electrochemical cell including a first electrode comprising an electrode structure as defined in claim 79, a second electrode and an electrolyte in effective contact with said electrodes.

86. An electrochemical cell as defined in claim 85 wherein said electrolyte is a proton donor electrolyte.

87. An electrochemical cell as defined in claim 85 wherein the second electrode comprises an air electrode.

88. An electrochemical cell as defined in claim 85 wherein the second electrode comprises nickelic hydroxide.

* * * * *